United States Patent
Ding

(10) Patent No.: US 12,432,347 B2
(45) Date of Patent: Sep. 30, 2025

(54) METHOD AND SYSTEM OF VIDEO CODING WITH REINFORCEMENT LEARNING RENDER-AWARE BITRATE CONTROL

(71) Applicant: Intel Corporation, Santa Clara, CA (US)

(72) Inventor: Ke Ding, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 792 days.

(21) Appl. No.: 17/463,957

(22) Filed: Sep. 1, 2021

(65) Prior Publication Data

US 2021/0400277 A1 Dec. 23, 2021

(51) Int. Cl.
| | | |
|---|---|---|
| *H04N 7/12* | (2006.01) | |
| *G06N 3/02* | (2006.01) | |
| *H04N 19/124* | (2014.01) | |
| *H04N 19/96* | (2014.01) | |

(52) U.S. Cl.
CPC ............ *H04N 19/124* (2014.11); *G06N 3/02* (2013.01); *H04N 19/96* (2014.11)

(58) Field of Classification Search
CPC .... H04N 19/124; H04N 19/96; H04N 19/137; H04N 19/14; H04N 19/115; G06N 3/02; G06N 3/048; G06N 5/01; G06N 3/08; G06N 3/04
USPC .................................................. 375/240.03
See application file for complete search history.

(56) References Cited

U.S. PATENT DOCUMENTS

| | | | |
|---|---|---|---|
| 10,454,987 B2* | 10/2019 | Chen | H04L 65/61 |
| 11,144,117 B1* | 10/2021 | Choudhuri | G06N 20/00 |
| 2016/0314354 A1* | 10/2016 | Teuton | G06V 20/695 |
| 2019/0096117 A1* | 3/2019 | Burke | G06T 15/04 |
| 2019/0354173 A1* | 11/2019 | Young | G06F 3/012 |
| 2020/0053393 A1* | 2/2020 | Niamut | H04N 19/597 |
| 2020/0351504 A1* | 11/2020 | Sen | H04N 21/8456 |
| 2021/0099686 A1* | 4/2021 | Panchagnula | H04N 19/597 |
| 2021/0127140 A1* | 4/2021 | Hannuksela | G06N 3/084 |
| 2021/0409789 A1* | 12/2021 | Han | H04L 67/61 |
| 2022/0138568 A1* | 5/2022 | Smolyanskiy | G06N 3/044 |
| | | | 706/21 |
| 2023/0334711 A1* | 10/2023 | Oh | H04N 21/4402 |
| 2024/0267532 A1* | 8/2024 | Zhernov | H04N 19/124 |

OTHER PUBLICATIONS

Hinton, G., et al., "Neural Networks for Machine Learning", Lecture 6a; Overview of mini-batch gradient descent; lecture slides; https://www.cs.toronto.edu/~tijmen/csc321/slides/lecture_slides_lec6.pdf.

Lillicrap, T., et al., "Continuous control with deep reinforcement learning", arXiv:1509.02971, 2016.

Mayanglambam, G., "Deep Learning Optimizers", SGD with momentum, Adagrad, Adadelta, Adam optimizer; Towards Data Science, Nov. 17, 2020; https://towardsdatascience.com/deep-learning-optimizers-436171c9e23f; 9 pages.

Mnih, V., et al., "Playing Atari with Deep Reinforcement Learning", NIPS Deep Learning Workshop 2013; arXiv:1312.5602; 9 pages.

(Continued)

*Primary Examiner* — Gims S Philippe
(74) *Attorney, Agent, or Firm* — Akona IP PC

(57) ABSTRACT

Techniques related to video coding include reinforcement-learning render-aware bitrate control.

25 Claims, 9 Drawing Sheets

(56) References Cited

OTHER PUBLICATIONS

Torres, J., "Deep Q-Network (DQN)-II", Experience Replay and Target Networks, Deep Reinforcement Learning Explained; Aug. 15, 2020, Towards Data Science; https://towardsdatascience.com/deep-q-network-dqn-ii-b6b2c; 15 pages.

* cited by examiner

METHOD AND SYSTEM OF VIDEO CODING WITH REINFORCEMENT LEARNING RENDER-AWARE BITRATE CONTROL

BACKGROUND

In video compression (codec) systems, the amount of bits processed or consumed per second, or bitrate, is controlled to achieve a target compression efficiency, good video quality, stability in network bandwidth over time such as with a target average bits per second. The bitrate may be set by using hard-coded heuristic rules, machine learning or deep learning techniques trained on specific images with preset content. The bitrate often can result in low performance and/or poor image quality because the bitrate setting techniques are not sufficiently adaptable to new situations not experienced before or trained on. Also, conventional encoders do not take advantage of rendering domain features when available on systems that render artificial computer generated images, such as with computer games, and then encode and transmit those images to remote devices for display.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
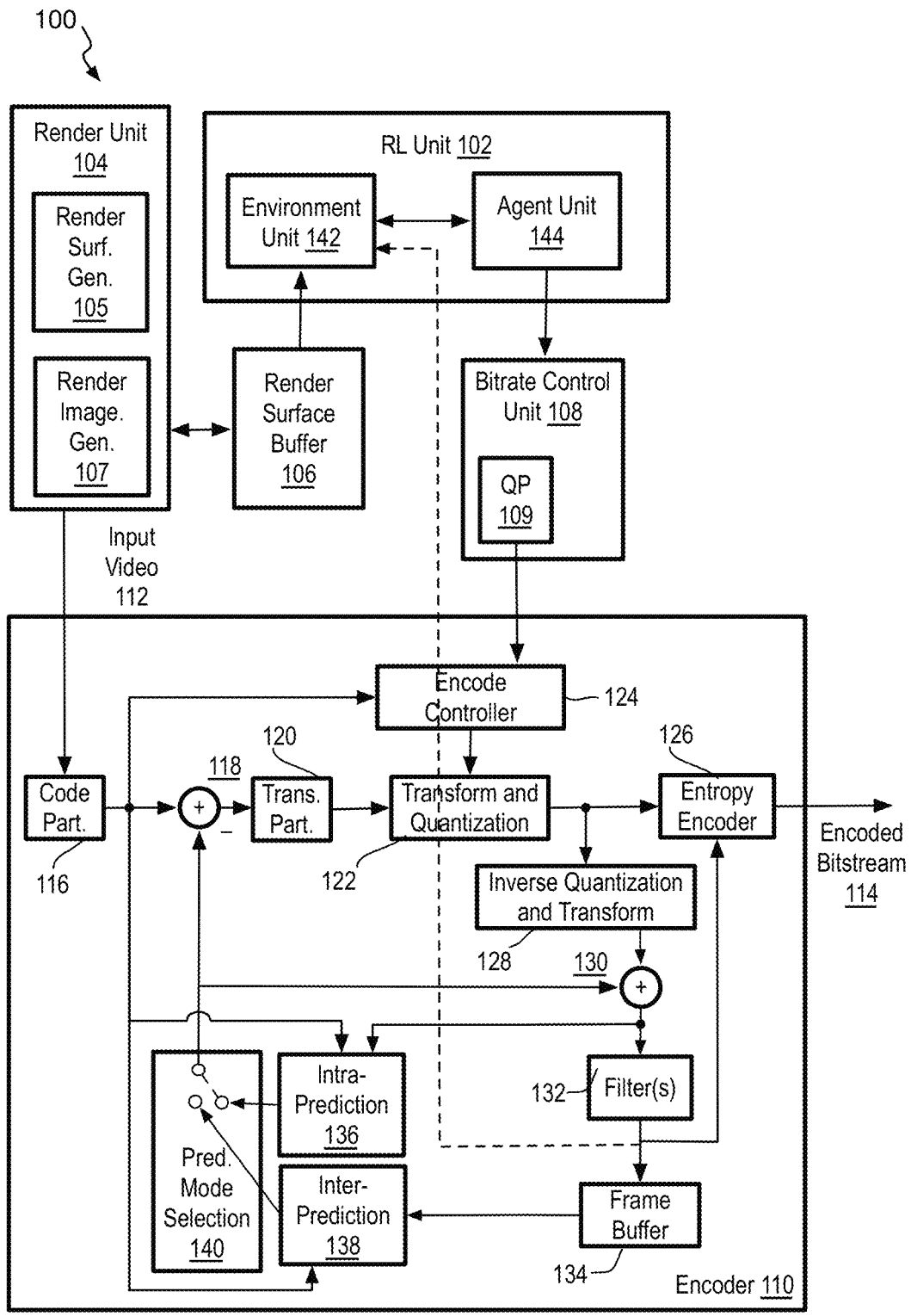
FIG. 1 is a schematic diagram of an image processing system according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various commercial or consumer computing devices and/or electronic devices such as internet or cloud servers, gaming engines, game consoles, set top boxes, smart phones, tablets, laptops, televisions, computers, mobile gaming devices, virtual, augmented, or modified reality headsets, and so forth, may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as DRAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, apparatuses, systems, computing platforms, and articles described herein are related to video coding with reinforcement learning render-aware bitrate control.

Numerous bitrate control algorithms exist for different video standards and different use cases such as cloud gaming, conference calls, remote desktops, and so forth. As mentioned, a bitrate control algorithm can balance among image quality, occupied bandwidth, network bandwidth stability over time, and acceptable image complexity to meet objectives of certain use cases. For example, cloud gaming involves a computer generating or rendering image data of artificial or augmented images. The rendered images for the cloud gaming are usually encoded and transmitted over bandwidth-limited networks to run on real-time applications on devices with computing-constrained platforms, such as game consoles or mobile devices such as smartphones. Thus, this can require a small bandwidth while very high quality images still are desired.

The bitrate is controlled during encoding of a video sequence by controlling the quantization of the images being encoded. Specifically, encoding often includes the quantization of image data values to a certain number of predetermined levels or steps to perform a type of lossy compression. A quantization parameter (QP) also referred to as a QP index, is used to determine a quantization step or level size (QP-step) for associating transformed image data coefficients with a finite set of steps. This also is referred to as quantization scale. Large values of QP represent large steps (large values of QP-step) that crudely approximate the spatial transform, so that most of the signal can be captured by only a few coefficients. However, while this results in less bits, more detail of the image is lost. Small QP values (and small QP-step) more accurately approximate the blocks spatial frequency spectrum thereby providing more image detail, but at the cost of more bits. The QPs may be provided on a frame-level or coding block level, such as macroblocks (MBs) or coding tree units (CTUs).

The conventional bitrate control algorithm (or rate control (RC) algorithm) often analyzes temporal and spatial complexity, frame type, MB or CTU type, and bit budget versus bits already consumed, and then determines the QPs. While traditionally, bitrate control algorithms used human hard-coded heuristic logic, more recent bitrate control algorithms use machine learning (ML) with regression models for example, or deep learning (DL) neural networks (DNNs) as a tool for video codec, which has provided a somewhat better balance of consumed bandwidth and image quality in a relatively efficient manner.

These conventional methods, however, are not sufficiently adaptive to provide a very good balance among image quality, bandwidth, stability, and/or complexity when an unexperienced situation occurs, being a combination of pixel image data forming an image not experienced before or trained on. This results because heuristic human experience with hard coded rate control logic is generated in experiments with fixed variables during development, while deep learning uses a relatively limited number of training images during offline training stages. These systems cannot properly balance between exploit (repeating decisions known to have worked well) and explore (making novel decisions with a hope of a greater reward but with greater risk of a poor solution).

To resolve these issues and provide a good balance for bitrate control more consistently, the disclosed system and adaptive methods uses a reinforcement learning render-aware rate control algorithm which can properly balance image quality, bandwidth, stability, and complexity for video encoding, and properly and more consistently handles the explore-vs-exploit determinations for situations not experienced before. The reinforcement learning approach is much more adaptable than traditional rule-based approaches and supervised deep learning-based approaches. The reinforcement learning involves a machine learning technique that enables a policy network, or just policy, to be developed by learning from feedback. Specifically, a neural network forming the policy can output a proper action based on input frames and states associated states with the frames. As the policy is implemented, correct or desirable actions provided by the policy are reinforced, and over time, the policy evolves to take actions that are more correct or produce greater rewards as indicated by the feedback, which is referred to as the reward (or feedback reward herein).

Given a limited number of next actions for each current state of the encoding environment, the values for each next action may be considered, and the best value may be selected for the next action. To accomplish this, the reinforcement learning (RL) system does not use supervised training datasets with ground truth labels, and unlike unsupervised learning that merely recognizes patterns in an input dataset, reinforcement learning goes further and determines, through experience, which are the next best actions based on an environment (or current state).

As another aspect of the disclosed method and system, the algorithms are render-aware so that the disclosed methods leverage rendering surfaces (also referred to herein as masks or maps) generated in correspondence to an image being rendered and then encoded. The rendered images and surfaces are rendered by circuits or components such as graphics processing unit's (GPUs), and the rendering surfaces may be available from the rendering GPU's internal buffers. Such a rendering surface may be a multi-sample control surface (MCS) buffer, which effectively may be an anti-aliasing map or edge map of an image. The GPU may use this surface to render edge pixels on an image differently than non-edge pixels to reduce computational load and increase efficiency. While the MCS or other rendering surfaces are initially formed for rendering, and when generated locally for display, this surface is known to be generated whether or not the corresponding rendered image is to be encoded. Thus, the rendering surface (or mask or map) is not generated solely for encoding. Other types of rendering surfaces provided by the rendering components or GPU could be used in addition or instead of the MCS.

By one form, the data of the rendering surface may be part of a current state used as input to a neural network that outputs one or more values to be used to set an encoder setting, such as a bitrate or quantization-related value, such as a quantization parameter (QP). By one form, the network may be a policy that generates actions of a reinforcement learning system or algorithm. This arrangement permits the disclosed methods and systems to improve network accuracy and efficiency while guiding the reinforcement learning (RL). In other words, the use of the rendering surfaces for bitrate control for example may substantially or fully utilize platform capability and provide a high quality, high performance bitrate balance tailored for cloud gaming, for example. Thus, the use of the auxiliary information in the form of a rendering surface available in the system can give certain deterministic information and guide the bitrate control algorithm without (or at least with minimum) additional computing and memory cost. This arrangement more fully utilizes the modern GPU with media, graphics, and artificial intelligence compute capability. It will be appreciated that the action may be a QP that is the encoder setting or may be used to determine the bitrate as the encoder setting. It also will be appreciated that the rendering surface also could be used to set encoder settings other than bitrate and thereby improve other encoding operations as well.

Referring to FIG. 1, an image processing system or device 100 operates methods disclosed herein for bitrate control using reinforced learning and/or using rendering surfaces generated by a renderer. Specifically, system 100 may have a reinforcement learning (RL) unit 102, a render unit 104, a render surface buffer 106, a bitrate control unit 108, and an encoder 110. The render unit 104 may have GPUs and other circuits that form a render image generation unit 107 to render artificial images and a render surface generation unit 105 to generate rendering surfaces used to render the images. The rendering surfaces and rendered images may be stored in buffers, and particularly relevant here, the rendering surfaces may be stored in a render surface buffer 106 that is one or more internal buffers of a GPU or other circuit performing the rendering. A bitrate control unit 108 may or may not be considered part of an encoder 110. The reference learning unit 102 may have an environment unit 142 that retrieves the render (or rendering) surfaces from the buffer 106 as well as the rendered images to form at least part of a current state of the reinforcement learning, and monitors the bitstream (or the reconstructed copies of the frame data to be placed in the bitstream) as well as the bitstream status, via the bitrate control 108 for example, to generate rewards that represent an evaluation of the action as described below. The bitrate control unit 108 may or may not be considered part of the environment unit 142 as well. The reference learning unit 102 also may have an agent unit 144 that provides action values to the bitrate control unit 108 at least partly based on the current state and rewards received from the environment unit 142 to evaluate the actions. Other details of the reference learning unit 102 and the rendering surface are provided below.

As to the encoder 100, the bitrate control unit 108 has a QP unit 109 to generate the QP index for quantization and provide it to the encode controller 124 of the encoder 110. The encoder 110 may use H.264, HEVC, AV1, or a different video coding standard. As shown, encoder 110 receives input video 112 from the renderer 104 and includes a coding partition unit 116, the encode controller 124, subtract or adder 118, transform partitioner unit 120, a transform and quantization module 122, and an entropy encoder 126. A decoding loop of the encoder 110 includes at least an inverse quantization and transform module 128, adder 130, in-loop filters 132, a frame buffer 134, an intra-prediction module 136, an inter-prediction module 138, and a prediction mode selection unit 140.

In operation, encoder 110 receives input video 112 from renderer 104 in any suitable format and may be received via any suitable technique such as downsampling, conversion from RGB to YUV or other color scheme, fetching from memory, transmission from another device, etc. As shown, once frames of input video 112 are partitioned by code partitioner 116, then the images may be provided to encode controller 124, intra-prediction module 136, and inter-prediction module 138. As shown, mode selection module 140 (e.g., via a switch), may select, for a coding unit or block or the like between an intra-prediction mode and an inter-prediction mode from their respective mode units 136 and 138. Based on the mode selection, a predicted portion of the video frame is differenced via differencer (or adder) 118 with the original portion of the video frame to generate a residual. The residual may be transferred to the transform partitioner 120 that divides the frames into transform blocks, and then the transform and quantization module 122, which may transform (e.g., via a discrete cosine transform or the like) the residual to determine transform coefficients and quantize the transform coefficients using the frame or block level QP received from the encode controller 124 and as discussed herein. The encode controller 124 provides the QP values to the quantization module 122. The quantized transform coefficients may be encoded via entropy encoder 126 and packed into encoded bitstream 114. The QP values as well as other data, such as motion vector residuals, modes data, transform size data, or the like also may be encoded and inserted into encoded bitstream 114 as well.

Furthermore at a decoding loop, the quantized transform coefficients are inverse quantized and inverse transformed via inverse quantization and transform module 128 to generate a reconstructed residual. The reconstructed residual may be combined with the aforementioned predicted portion at adder 130 to form a reconstructed portion, which may be filtered using in-loop filters 132 to generate a reconstructed frame. The reconstructed frame is then saved to frame buffer 134 and used as a reference frame for encoding other portions of the current or other video frames. The reinforcement learning unit 102, bitrate control 108, and/or encoder controller 124 may monitor the reconstructed frames, as representing the quality of the encoded images to be placed in the bitstream, as well as the bitstream status, via the bitrate control for example. A reward value then may be generated by using the monitored data and that is an evaluation of the quality of the encoded reconstructed images and performance of the encoder. The reward may be provided to the agent unit 144 as explained below. Such rewards may be generated per frame or per coding block. Such encoding may be repeated for any additional frames of input video 112, and the reconstructed data may be provided to the reinforcement unit 102 continuously or substantially continuously while encoding a video sequence.

Figure 2:
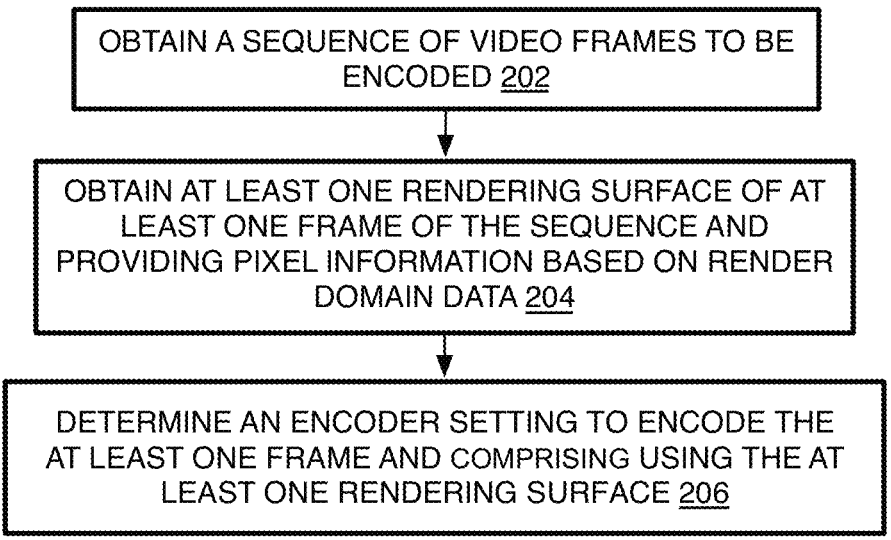
FIG. 2 is a flow chart of an example method of video coding with render-aware bitrate control according to at least one of the implementations herein.

Referring to FIG. 2, an example process 200 for video coding with render-aware bitrate control is arranged in accordance with at least some implementations of the present disclosure. Process 200 may include one or more operations 202-206 numbered evenly. By way of non-limiting example, process 200 may perform a coding process as performed by any device, system, or unit as discussed herein such as system, device, or unit 100, 400, 500, 700, and/or 800 of FIGS. 1, 4-5, 7, and/or 8 respectively, and where relevant.

Process 200 may include "obtain a sequence of video frames to be encoded" 202, and whether obtained directly from a rendering operation or from memory. By one approach, the frames are rendered, such as computer generated, rather than being captured by a camera. This operation may include any pre-processing sufficient for encoding.

Process 200 may include "obtain at least one rendering surface of at least one frame of the sequence and providing pixel information based on render domain data" 204. By the example describe herein, the rendering surface includes pixel data to be used to render a corresponding frame of the video sequence. The rendering surface may be generated as a multi-sample control surface (MCS) that uses sub-pixel samples to generate a pixel level edge map or mask. Other or more such rendering surfaces, created from data of GPU internal buffers for example, may be used instead. The MCS or other rendering surface may be stored at one or more internal GPU buffers, and generated during a rendering process including rasterization to group data of sub-pixel size sub-samples into pixels. The data of the samples are generated by using vertex data of primitives from the render domain. By one form, the generation (and storing) of the rendering surface is performed to render an image whether or not the image is to be encoded. The rendered image could be displayed locally, and the decision of the encoding may be omitted for many reasons. Also, it will be understood that the rendering surface refers to image data as the data is placed in a buffer to be used for rendering, and the surface does not necessarily exist as a complete surface of an entire image stored or otherwise maintained at one time.

Process 200 may include "determine an encoder setting to encode the at least one frame and comprising using the at least one rendering surface" 206. Here, data of the rendering surface may be used as neural network input to generate an encoder setting value that is, or may be used to set, the encoder setting, such as a bitrate control value, that is, or is used to set, a quantization-related value such a quantization parameter (QP). By one approach, a rendering surface may be used as at least part of an environment current state for reinforcement learning and that is provided to an agent of the reinforcement learning with a policy to generate an action that is provided to the bitrate control to in turn, generate the quantization-related value. The encoder setting may be set per-frame or per coding block, such as MB or CTU, or both may be available to the encoder.

Figure 3:
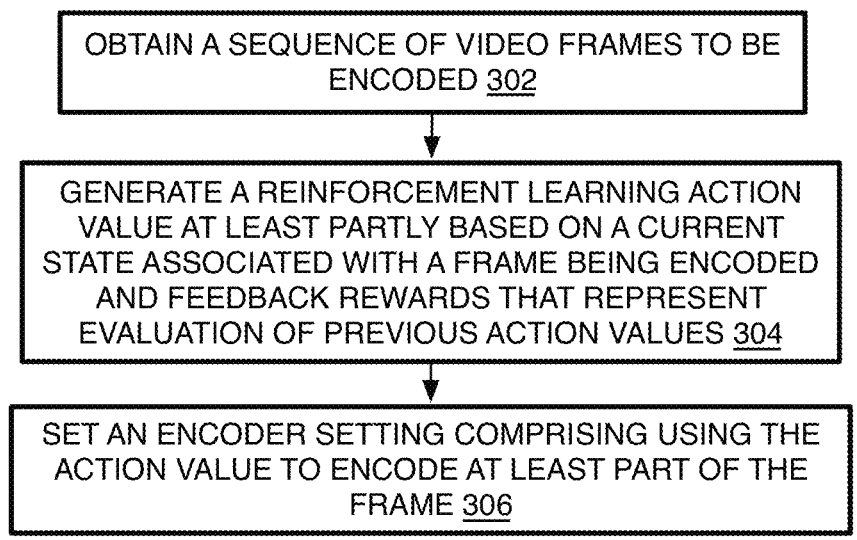
FIG. 3 is a flow chart of an example method of video coding with reinforcement learning bitrate control according to at least one of the implementations herein.

Referring to FIG. 3, an example process 300 for video coding with reinforcement-learning bitrate control is arranged in accordance with at least some implementations of the present disclosure. Process 300 may include one or more operations 302-306 numbered evenly. By way of non-limiting example, process 300 may perform a coding process as performed by any device, system, or unit as discussed herein such as system, device, or unit 100, 400, 500, 700 and/or 800 of FIGS. 1, 4-5, 7, and 8 respectively, and where relevant.

Process 300 may include "obtain a sequence of video frames to be encoded" 302, and whether obtained directly from a rendering operation or from memory. By one approach, the frames are artificial and rendered such as computer generated rather than being captured by a camera, as mentioned above with operation 202.

Process 300 may include "generate a reinforcement learning action value at least partly based on a current state associated with a frame being encoded and feedback rewards that represent evaluation of previous action values" 304. Here, reinforcement learning is a deep neural network system that may be performed and that includes an environment unit that generates a current state. The state is provided to an actor or policy network to generate the action based on the state and at least indirectly based on feedback rewards provided from the environment unit and to the agent. By one form, the rewards represent an evaluation of previous actions and are each a value indicating quality of the output images of an encoder encoding the rendered images, and/or bitstream status relative to a target bitrate and as to whether it is experiencing underflow (bitrate too low) or overflow (bitrate too high). A critic or value policy at the agent receives the current state and corresponding action, and outputs a deterministic gradient that can be used to update the parameters of the policy network. The reward from the environment unit may be used to update the parameters of the critic value network. The state may be formed from many factors including data of the rendering surface buffer mentioned above, the image data itself, residuals from the encoder, a bitstream status such as the amount of bits, used, remaining, and targeted, QPs from previous states and/or actions, a frame or block (MB or CTU) index, and so forth. The contents of the current state may indicate the current state of the system or encoder which may include the RL unit, the encoder, bitrate control, bitstream itself, and so forth.

Process 300 may include "set an encoder setting comprising using the action value to encode at least part of the frame" 306. By one example, the action value is a quantization-related value such as the QP, while the encoder setting is the target bitrate for example. By other forms, the action value could be some quantization scaling value that is used to compute the QP as the encoder setting here. Many variations exist, and many other encoding settings could be set in addition or instead of a quantization-related value.

Figure 4:
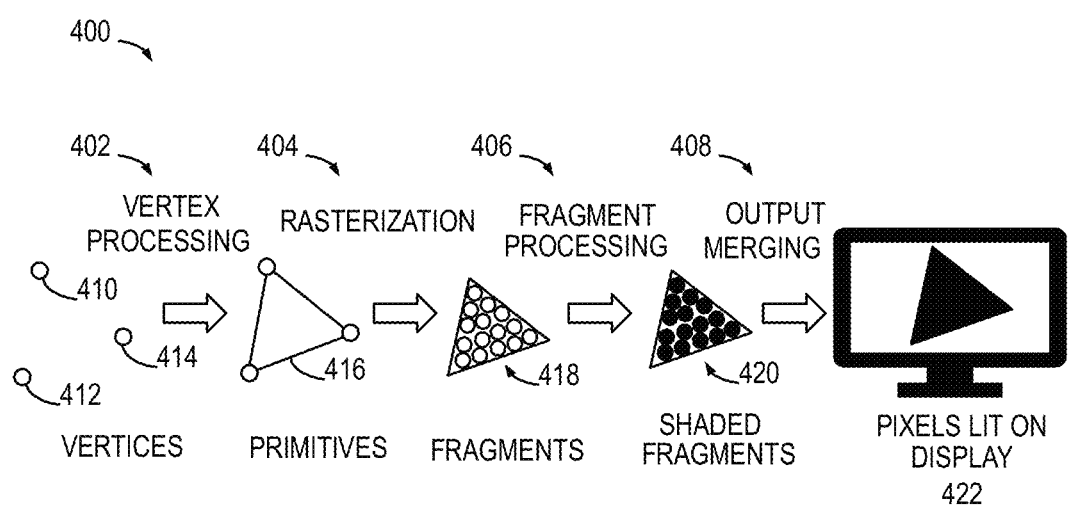
FIG. 4 is a schematic flow diagram of an image rendering method according to at least one of the implementations herein.

Referring to FIG. 4, an example rendering process 400 is used to demonstrate the generation of the rendered image and the rendering surfaces. Particularly, and by one example, rendering or computer graphics applications may rely on rasterization to perform rendering using a graphics processing unit (GPU). For example, in 3D games, rasterization enables execution of shaders (e.g., kernel programs) at various stages of the 3D pipeline (e.g., vertex, geometry, samples, pixel, etc.). The time to render a frame depends on the number of invocations of the shaders for each object and the length of the shader.

In one example here, the rendering (or rasterization) system 400 may include an example vertex processing stage 402, an example rasterization stage 404, an example fragment processing stage 406, and an example output merging stage 408. It will be understood other detailed operations may be performed but need not be explained for the understanding of the disclosed methods herein. During the example vertex processing stage 402, the GPU obtains or identifies an example first vertex 410, an example second vertex 412, and an example third vertex 414 of a set of vertices forming a rendering model that may be considered the render domain or render domain data, for example, to form a single image. Each vertex may have, store, or otherwise be associated with image data such as color data often provided as UV values, as well as position and normal (direction) data. The vertex processing involves having one or more GPUs generate example primitives 416 based on the vertices forming the rendering model. The example primitive 416 may be a triangle in this example although other shapes could be used.

During the example rasterization stage 404, the GPU generates multiple example fragments 418 by segmenting or rasterizing the primitive 416 into the fragments 418. The GPU can rasterize to create 1×, 2×, 4×, 8×, 16×, etc. samples or fragments in a single primitive where each sample or fragment represents one pixel in the resolution to be used to render an image. As fragments in this stage, the samples or fragments, and in turn pixels, are colorless. In some examples, a sample is a sample point at a center of a fragment, and the rendering unit can set the sample positions within pixels before rendering. As explained below, each fragment may have multiple samples, here referred to as sub-pixel samples or sub-samples, in a predetermined pattern on the fragment, and in turn on a single pixel as follows.

During the fragment processing stage 406, the GPU generates example shaded fragments 420. For example, the GPU shades the fragments 418 to generate the shaded fragments 420. This is performed by using interpolation algorithms that use the color data of the vertices 410, 412, and 414 of the individual primitives 416 to interpolate the color of the fragments or pixels (or samples) 418 within the primitive. As mentioned, a sample is considered a sample point that is in the center of each fragment or pixel 418. Instead of providing a single color for the sample of a fragment, the interpolation can be performed on a sub-pixel basis where each fragment has multiple sub-pixel sub-sample points. By one example, each fragment has four or other number of sub-sample points arranged in a certain shape such as corners of a square. Once the colors for the sub-samples are generated by using the color of the vertices, algorithms can be applied that combines the colors of the sub-samples on a single fragment or pixel into one color for the fragment or pixel.

Thereafter, an output merging stage 408 is conducted that provides the pixels their final color for display in a 2D image 422. This may involve using depth buffers when 3D models are used, contents of stencil buffers, data of a pipeline state, content of render targets, and so forth.

The rendering algorithms also may use rendering surfaces to assist with the rendering operations to increase accuracy. For example, multi-sample anti-aliasing (MSAA) is a hardware acceleration technique used in the rasterization process performed by rendering GPUs to improve the quality of rendered output. GPUs typically use fixed function hardware and an optimized memory model to manage rendering to a MSAA buffer. Modern graphics APIs such as DirectX 12 permit applications to set the MSAA sample positions before rendering.

By one form, the samples of the fragments in an MSAA buffer may be written to an MSAA mask (or map or surface) buffer, which is the rendering surface buffer mentioned herein, and also is an internal GPU buffer that may be referred to as a multi-sample control surface (MCS) buffer thereby forming an MCS as the rendering surface.

By one form, the MCS may be used to perform anti-aliasing and super resolution (upscaling) and depending on the shaded fragments 420. Particularly, the sub-samples within each pixel (or shaded fragment) 420 are compared. When all of the sub-samples of a fragment (or pixel) are the same, this indicates the pixel is in a uniform or non-edge area of an image, and the pixel is given one color or grey shade, such as white, on the MCS. On the other hand, when the sub-samples of the same single pixel are different, this indicates that the pixel is on or along an edge of an object in the content of the image, and given another color or grey-shade that is different than that of the non-edge pixels, such as black. These pixel indicators or information is stored in the MCS buffer as mentioned. Thus, the MCS effectively forms an edge map or mask so that edge pixels identify potential pixel aliasing regions and can be treated differently for super resolution (or upscaling). It also indicates the higher texture complexity compared to other areas on the image. By one example, a 2×MSAA (with two samples per pixel) may be used to generate the MCS and store the MCS in the MCS buffer. An example rendering surface 506, such as an MCS, and a corresponding rendered image 507 are shown as input to reinforcement learning system 500 (FIG. 5).

Figure 5:
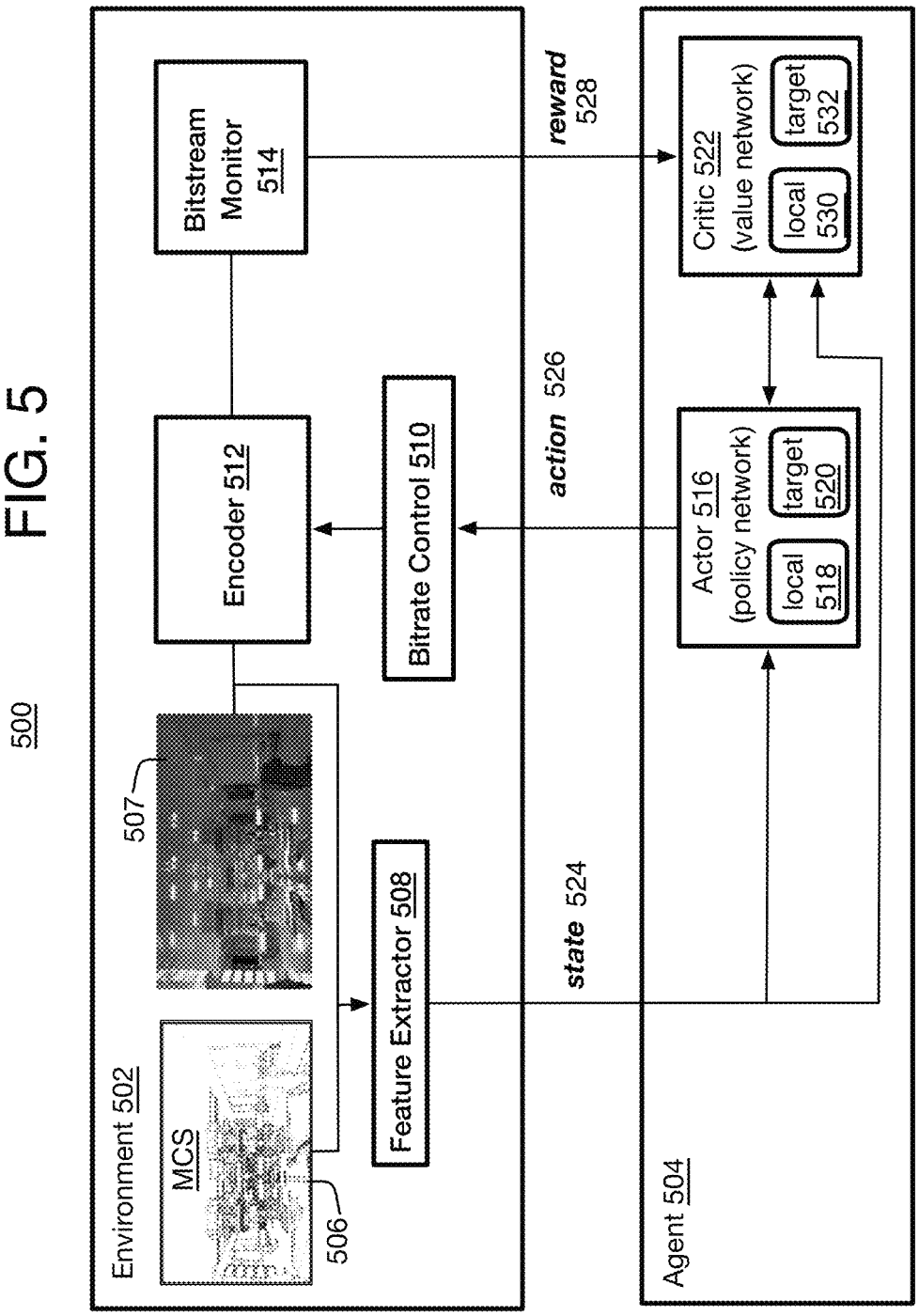
FIG. 5 is a schematic diagram of an image processing system for encoding with reinforcement learning render-aware bitrate control according to at least one of the implementations herein.

Referring to FIG. 5, the example reinforcement learning (RL) system 500 may be used to operate a method of reinforcement learning render-aware bitrate control according to at least one of the implementations herein. The reinforcement learning system 500, may be the same or similar to reinforcement unit 102, and may have an environment unit 502 and an agent unit 504. The environment unit 502 may receive image data of a rendered image 507 as well as a rendering surface 506, such as the MCS, as well as other data to be used to generate a current state by a feature extraction unit 508. The environment unit 502 may include an encoder 512 that will encode the rendered image 507. A bitrate control 510 receives actions from the agent unit 504 to set an encoder setting such as the bitrate or quantization-related value. A bitstream monitor 514 may monitor the status of the bitstream, and may or may not be part of the bitrate control 510, to be used to generate reward feedback (or feedback rewards) provided from the environment unit 502 to the agent unit 504. The bitstream monitor unit 514 also may be considered the reward generator, and therefore may generate or receive encoded image evaluation data or other data to be used to generate the reward as described below.

The agent 504 is arranged to set the encoder setting to attempt to achieve the best quality and stability possible. Such agent algorithms maintain a very good balance between 'exploit' decisions previously made with known results versus 'explore' decisions where new solutions are tried for states that were not experienced before where both the chances of success as well as the risk of failure are much greater. A number of different reinforcement learning algorithms exist to achieve this, such as deep Q-learning network (DQN), double deep Q-learning network (DDQN), asynchronous advantage actor-critic (A3C), Rainbow, and so forth.

Here, however, an example deep deterministic policy gradient (DDPG) RL algorithm is used in the implementations. DDPG is an off-policy actor-critic algorithm that can provide a single action value for setting an encoder setting such as a bitrate or quantization-related value such as a QP rather than a stochastic system that provides a distribution of probabilities of different possible solutions and requires further analysis to select a solution that is a most likely a best probability of success. DDPG may be considered as a combination of a deep Q-learning network (DQN) and an actor-critic (AC) network; it has the advantage of handling continuous action state space with fast convergence ability.

In one or more implementations, the DDPG agent structure comprises at least two parts: an actor 516 and a critic 522. The actor 516 aims to provide the best action 526 for a specific state 524 and may be a policy network (or neural network). The actor 516 has a local unit 518 (or local network) for the policy network and a copy target unit 520 (or target network) which are used in a target network technique to stabilize learning by reducing over-estimation as described below. The critic 522 receives the rewards 528 that represents the evaluation of an action and indicates a level of inference accuracy and/or encoding efficiency. The critic 522, by one example, is a value network (or neural network) or model that has a compressed size due to the decomposition of prior iterations, and evaluates a policy function estimated by the actor and at least partly based on minimizing an error, such as a temporal difference (TD) error. The critic also has a local unit 530 and a copy target unit 532. Other details are provided below with process 600.

Figure 6:
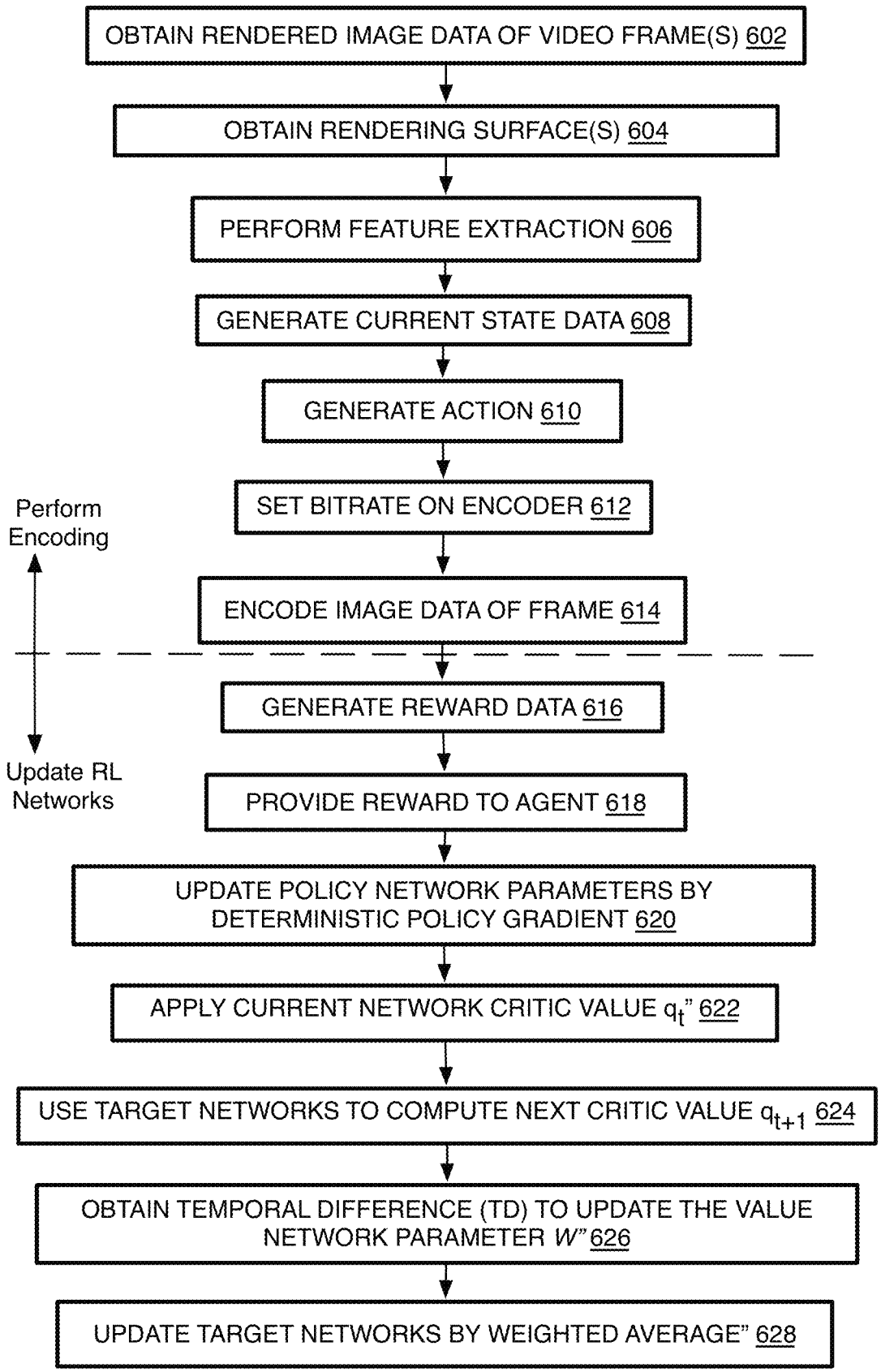
FIG. 6 is a detailed flow chart of a method of video coding with reinforcement learning render-aware bitrate control according to at least one of the implementations herein.

Referring to FIG. 6, an example process 600 of video coding with reinforcement learning render-aware bitrate control is arranged in accordance with at least some implementations of the present disclosure. Process 600 may include one or more operations 602-628 generally numbered evenly, and where operations 602-614 are more directly related to operating an encoder, while operations 616 to 628 are more directly related to updating the reinforcement learning models. By way of non-limiting example, process 600 may perform a coding process as performed by any device, system, or unit as discussed herein such as at least system, device, or unit 100, 400, 500, 700, and/or 800 of FIGS. 1, 4-5 and 7-8 respectively, and where relevant.

With regard to the environment status of the reinforcement learning, the entire encoding process may be treated as part of the environment for the reinforcement learning. The reinforcement learning generates a current state to reflect context for a current input frame and operating limitations or parameters related to the encoder setting being generated, which in the present example is bit budget. Thus, the current state also can be considered to represent a concrete description of the environment, which the agent uses to determine the encoder setting, such as a QP and bit budget (or bitrate) to encode a current frame. Thus, the current state of the encoder may be used to determine an appropriate action, and many different types of data related to the encoding may be used to generate the current state. The current state can be in the form of a state vector of multiple different types of data that each may indicate one or more factors used to determine an encoder setting such as target compression efficiency, video quality, stability in network bandwidth over time, complexity of the image, and so forth. The details for generating a state are as follows.

The images being encoded are images rendered by a rendering unit with a GPU or other processor circuitry that can also be used as part of the current state in order to indicate the complexity of the content of the rendered image. The rendered image data can assist with indicting the complexity of the image texture, and specifically showing whether the image is a single uniform or flat color versus a complex image showing many objects, shapes, patterns, and so forth. Thus, process 600 may include "obtain rendered image data of frame(s)" 602 both to encode the images and to use the images as part of the current state. The image data of the example rendered image 507, for example, may be obtained from a rendered image or frame buffer, also referred to as a color buffer. The image pixel data may be of a known color scheme such as YUV, RGB, and so forth. It should be noted this includes any rendered image format including those images being provided in black and white, grey-scale, or luminance values only. This operation may include any color scheme conversion into encoder-compatible color schemes such as YUV if not already provided in that color scheme, and any other pre-processing necessary for the encoding, such as de-noising, scaling, and so forth.

Process 600 may include "obtain rendering surface(s)" 604, and particular to use the data of the surface to assist to indicate the current state or environment for the reinforcement learning, and as with the rendered image data itself, to assist with showing the complexity of the texture of the image or content of the image. The rendering surface may be the MCS (or MSAA surface) obtained from rendering or GPU buffers, such as an internal buffer of the GPU that may be on-board with the GPU as part of the same SoC for example. In other words, internal refers to those buffers that are not required by drivers or an OS level. Instead, the internal buffers are generated as a by-product of a GPU itself.

Other rendering surfaces may be used instead of, or in addition to, the MCS. These other rendering surfaces also may be generated during the rendering process, such as by a GPU or other circuitry, and occupy GPU or other rendering internal buffers available during the rendering and rasterization process, such as depth maps, motion vector (MV)s, object identification maps, and so forth. These rendering maps also can be used to infer the texture complexity, similar to the MCS.

Process 600 may include "perform feature extraction" 606. The MCS buffer together with the color buffer are fed into a feature extractor unit 508 to generate the important context information for the current state. By one approach, the feature extractor 508 can have a combination of computer vision functions and a pre-trained convolutional neural network backbone such as ResNET or visual geometry group network (VGGnet). The extraction herein refers to a general sense to obtain data in any way available such as obtaining the data from processor circuitry, accessing memory such as one or more buffers, to obtain the data, and so forth.

A current state buffer may hold data to represent the current state and may include data of a number of different types, and may be placed in a state vector. The data held in the state vector may have different forms including convolved data from convolutional neural network layers mentioned. Thus, by one form, the MCS may be obtained from memory and placed as input into one or more neural network convolutional layers. The structure of the neural network may be determined by experimentation and training. A similar process may be performed for the image data of the rendered image where the image data is placed in neural network layer inputs to propagate through one or more neural network layers, and this may or may not be the same neural network used for the rendering surface. By one example neural network structure, the neural network may have three fully connected layers, followed by a ReLU activation layer and a sigmoid layer for output as follows with the sample pseudocode:

```
self.fc1 = nn.Linear(nb_states, hidden1)
self.fc2 = nn.Linear(hidden1, hidden2)
self.fc3 = nn.Linear(hidden2, nb_actions)
self.relu = nn.ReLU( )
self.sigmoid = nn.Sigmoid( ).
```

Other types of image data that may be added (or in other words extracted) to form the current state may include residuals generated from differencing original rendered image data and predictions from the decoding loop of the encoder and of MBs or CTUs, which may be obtained from encoder buffers holding that data. The residual may be just the residual of the block being coded or could be another set from the same frame such as all residuals generated so far for a frame, or could be a combination such as an average, of these values. The residuals also may be input to the convolutional neural network, or other type of neural network, of the feature extractor.

The current state also may have SAD values for a current frame, frame type (I, P or B), coded unit type (intra, inter, or skip), data for bitstream context such as the amount of bits at a current bitrate already consumed, the capacity in bitrate remaining, a target bitrate, as well as other bitrate related values, and PSNR, SSIM and QP values from earlier encoded frames.

The current state also may include QPs from one or more previous state-action pairs where a state is used to generate the action in the pair. By one form, this may be provided, or updated, on a frame or coding block (MB or CTU for example) basis depending on how the encoder sets the bitrate (or QP), and in turn, how often the action is provided. Thus, by one approach, the previous state-action pair is of the previous frame when frame level QPs are being used, but could be the QPs of the state-action pair of the same coding block (such as the same MB or CTU) on the previous frame, and repeated for each or individual coding block. Otherwise, previous may refer to spatially on the same frame so that the QP of the state-action pair included in the current state is of the pair of the previous coding block on the same frame. In any of these examples, the previous instance may be the one consecutive previous block or frame, or previous at some interval, such as three blocks or frames prior, or may be more than one instance whether added individually to the current state or combined, such as by a QP average. By another form, the current state may always provide QPs of one or the other or both frame and coding block level state-action pair regardless of when the encoder generates a new QP. Thus, when the encoder only uses frame QPs, the current state still could be provided for each block as well as for each frame. By one example, the frame state-action pair may be the first code block state-action pair of a frame. Many other possible variations are contemplated.

The current state also may include a frame index, and/or coding block (MB or CTU) index to track the data placed on the current state vector. Other characteristics that tend to show quality, complexity, stability, and so forth may be added as well such as those mentioned above.

Process 600 may include "generate current state data" 608. In the example implementation, once, or as, the data is in a format to be added to the state vector the data may be concatenated together, or otherwise combined to form a single vector, tensor, or other organized group of data, as long as the state vector (or other structure) can be input to a policy network.

Turning now to the agent of the RL algorithm, process 600 may include "generate action" 610. Again, this may be performed on a frame basis or coding block (or unit) basis depending on whether the encoder is performing frame level rate control, coding block level rate control, or has the option to do either.

By one form, the action space may be the QP values for a frame or coding unit. By another alternative, the action values may be values the bit controller can use to set the QP value. As mentioned, the agent has a DDPG actor or policy network that receives the current state as input, and the policy network decides whether or not to output a current action according to:

$$\alpha = \pi(s; \Theta) \quad (1)$$

where $\alpha$ is the action, a policy network model $\pi$ has parameters $\Theta$, and s is the current state. The policy network may have several fully connected layers followed by an activation layer, such as a rectified linear (ReLU) activation for output. The policy network performs normalization of intermediate continuous values generated over time as current states are received, and maps those values to integer QPs, while factoring video coding standard requirements, to generate a normalized QP output as a deterministic action $\alpha$. If the DDPG is for frame level bitrate control, this action value will be mapped to a frame level QP; if it is for coding unit level rate control, the action value will be mapped to the coding unit level QP. The parameters $\Theta$ may be weights and/or bias of the neural network, and where the neural network may have the example structure shown above.

Process 600 may include "set bitrate on encoder" 612, where the action, which here is a QP in this example, may be provided to a bit rate controller to set the bitrate by providing the QP to the quantization unit of the encoder. Ideally, the actor policy network of the RL algorithm considers all or most of the factors that the bitrate controller is considering so that the bit rate controller does need to make any other adjustments to the QP. However, in certain cases, the bitrate controller may adjust the QP anyway before passing the QP to the quantization unit of the encoder, whether to adjust for updated or different target bitrates, compression efficiency, image complexity, image quality, stability, and so forth. The bitrate controller also may limit the QP to thresholds for example.

Process 600 may include "encode image data of frame" 614, where the QP is used by the encoder to quantize the residuals from upstream on the encoder, which in most cases is in discrete cosine coefficient (DCT) form when ready for quantization. The residuals are then entropy encoded and placed in the bitstream, and decoded on the decoding loop of the encoder for use to generate predictions.

While the operations 602 to 614 described above are used to perform the encoding with the reinforcement learning render-aware bitrate control, the following operations 616 to 628 are more directed to updating the parameters $\Theta$ of the actor or policy network of the RL so that the provided action is the best encoder setting according to the desired bitrate control factors discussed above. The goodness of the actor is indicated by a reward. The rewards are used to set parameters of the critic value network, which in turn determines a deterministic policy gradient provided from the critic value network to the actor to update the actor parameters, thereby training the policy network during a run-time and by using a deterministic policy gradient algorithm as follows.

Process 600 may include "generate reward data" 616. The reward represents an evaluation of the action. In other words, the reward may be a numeric value used to indicate the quality or "goodness" of the current action, and generally may be set here to indicate encoding quality and relevant performance related to actual bitrates. In the present example, the reward may be a weighted combination of encoded frame image quality and current bit consumption (or bitstream) status, such as whether the actual bitrate is too small (underflow) or too large (overflow) relative to a target bitrate since these are two important factors of bitrate control. The encoded frame quality may be generated by obtaining, or accessing, reconstructed frames from the decoding loop of the encoder, and determining the frame peak signal-to-noise ratio (PSNR), frame structural similarity index (SSIM), and/or other frame quality indicators. The bit consumption status may be measured by comparing a current bitrate of the encoder to a buffer or target bitrate, and so forth. A different combination of factors, whether those mentioned or different factors, could be used as the reward depending on what is considered important criteria for bitrate control or another encoder setting be generated as the action.

The reward may be computed as a single value, and this can be accomplished, as one example approach, by receiving a level value among a preset possible range of values for each type of evaluation being provided for the reward, such as PSNR, SSIM, and either a bitrate status value (such as the current bitrate) or a difference value between actual bitrate and target bitrate set by the bitrate controller. A final reward value may be a numerical value to determine quality of the encoded image. This final reward can have a weighted sum of the different aspects that impact the quality, such as the PSNR, SSIM, bitrate status, and so forth. The weight for each factor can be tuned depending on actual use cases. Many other variations are possible.

Figure 8:
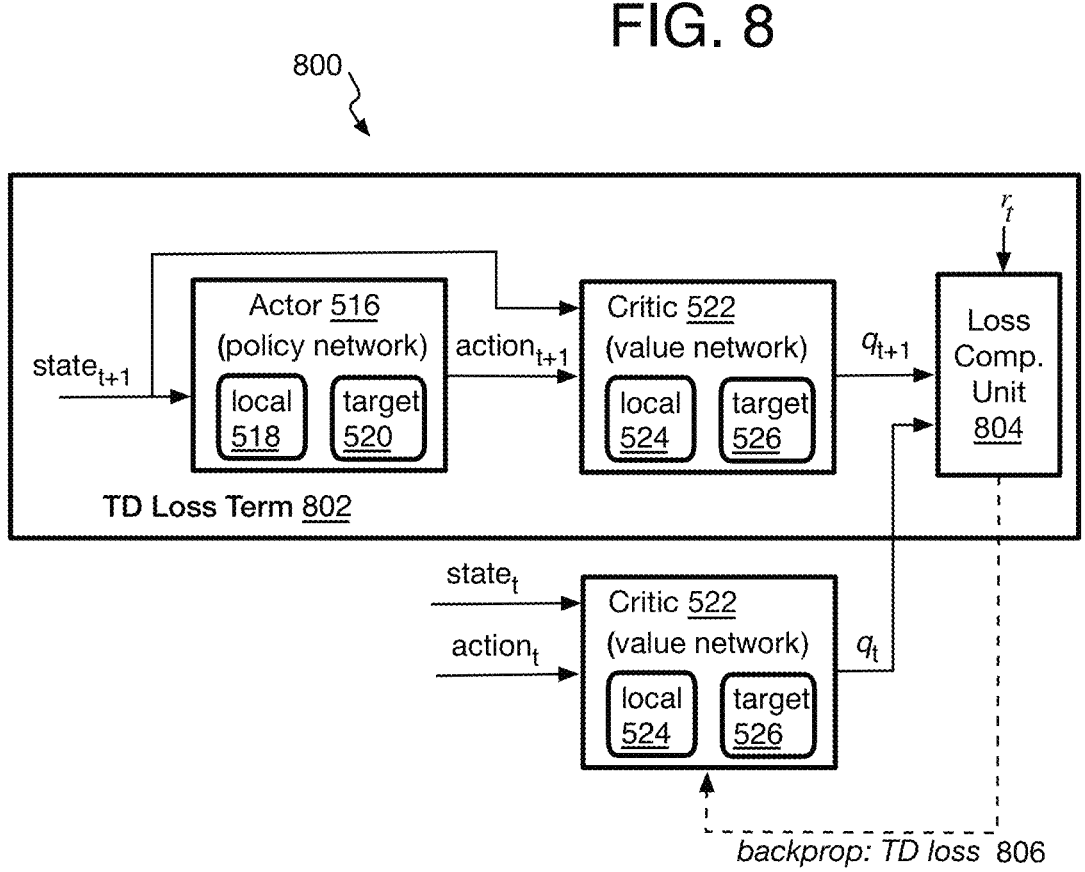
FIG. 8 is a schematic diagram of an image processing system for training a critic value network for reinforcement learning bitrate control according to at least one of the implementations herein.

Process 600 may include "provide reward to agent" 618 where the agent's critic or value policy obtains the reward, which may be a reward signal, or the reward value may be obtained from memory. The reward is subsequently used to update the parameters W of the critic value network using a temporal difference (TD) algorithm, explained farther below (operation 626) and system 800 (FIG. 8).

Figure 7:
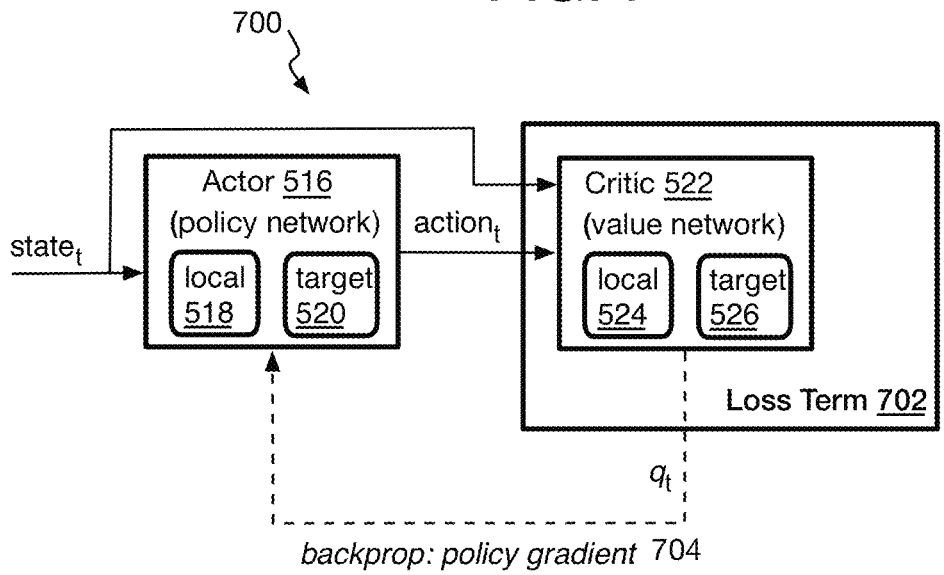
FIG. 7 is a schematic diagram of an image processing system for training an actor policy network for reinforcement learning bitrate control according to at least one of the implementations herein.

First though while referring to FIG. 7, a system 700 shows only those components of system 500 relevant to the updating of the policy network at the actor. Thus, process 600 may include "update policy network parameters Θ by deterministic policy gradient" 620. Here, the deterministic policy gradient, also referred to as the output current critic value of a loss term operation 702, may be computed as follows:

$$q_t = q(s; \alpha; W)''618 \qquad (2)$$

where a model of a value network q has parameters W, and s and α are as mentioned above in equation (1). The critic value network may have a similar network topology as the actor policy network. In the case of the value network, the input is the current state s and action α from the actor policy network, and the output is the critic value (or deterministic policy gradient) $q_t$.

Process 600 may include "apply current network critic value $q_t$" 622, and here the critic value $q_t$ is applied to adjust the weights of the local policy network (versus the target network explained below). This is accomplished by a back propagation operation 704 so that the gradient $q_t$ may be applied to the weights of the policy network by a deep learning optimizer such as stochastic gradient descent (SGD), root mean square propagation (RMSProp) optimizer (see www.cs.toronto.edu/~tijmen/csc321/slides/ lecture_slides_lec6.pdf), or adaptive moment estimation (Adam) optimizer. Thus, the optimizers update network weights and bias via the backpropagation.

Referring now to FIG. 8, a system 800 is shown with the units relevant to training or updating the critic value network. Thus, process 600 may initially include "use target networks to compute next critic value $q_{t+1}$" 624. Particularly, a target network method may be used to better stabilize learning by reducing over-estimation typically found in RL networks. Specifically, in Q-learning, and in turn DDPG, the agent updates the value of executing an action in the current state, using the values of executing actions in one or more successive (or future) states. This procedure, however, often results in an instability because the values change simultaneously on both sides of the update equation. This refers to the fact that harmful, overly-strong correlations exist between actions and states because only a single iteration exists between $q_t$ and $q_{t+1}$ resulting in the neural network often having difficulty distinguishing between the two, and this may undesirably alter the future estimations of a number of different states. Thus, a target network is a delayed copy of the estimated value function of the current or local policy or value network and that is held fixed over a certain number of iterations or episodes to serve as a stable target so that updating occurs with non-consecutive critic q values. This reduces the over-estimation because maximum values correlated too strongly with certain actions can be de-emphasized. Thus, the policy network 516 may be formed of a local network 518 that is continuously changing and a copy target network 520 that is held fixed until updated and is used to output actions. Similarly, the critic 522 has a local network 530 and a copy target network 532 with the same or similar characteristics. It should be noted that the actor and critic could be operated on the main or local network alone without the target network if desired.

The future gradient $q_{t+1}$ is obtained by using the optimizers mentioned above and that perform gradient descent to set weight values for the neural networks.

Process 600 then may include "obtain temporal difference (TD) to update the value network parameter W" 626, where the TD may be referred to as the TD error or loss computed by the TD loss term unit 802. The TD loss term unit 802 may have a loss computation unit 804 that generally determines a difference between the current $q_t$ and future $q_{t+1}$ modified as follows:

$$\text{TD Loss} = q_t - (r_t + \gamma^* q_{t+1}) \qquad (3)$$

where $q_t$ and $q_{t+1}$ are the policy gradients at time t and t+1, respectively, and may be considered loss terms for equation (3), and where $r_t$ is the reward at time t, and where γ is a discount factor, or in other words, a probability to succeed at every step Δt. By one form, γ may be a value at or between 0 to 1.

Once the TD loss is computed, the parameters W in the value network of the critic may be updated by using the TD loss value in back propagation in the same way that $q_t$ was used to update the parameters Θ of the policy network. This updates the local network of the critic value network.

Process 600 may include "update target networks by weighted average" 628. The target networks of both the policy and value networks are then respectively updated by using weighted averages of $q_t$ and TD loss over a number of iterations. The target networks, rather than the local networks, can then be used to determine the future gradient $q_{t+1}$ and the actions on the target network of the actor at least during a training period (that can occur during the run-time of the system).

This completes one full iteration for training and weight updates in an episode. This process may be repeated until the network is converged. Once the models (actor, critic) are fully trained, they now learn how to generate good action. So in the inference stage by one example, only the actor network may be needed because the RL system already knows how to generate the best action given a state and with a well-trained actor.

It should be noted that an episode for the RL encoder setting has a different duration depending on whether RL is used for frame level or coding block level rate control. In an example implementation, the encoder can use both episode types to have both the fine-granularity control of the bitrate or use the coarse-granularity frame-level bitrate control instead, and as needed. When the reinforcement learning operations generate one QP to encode one entire frame, then a single episode is performed when encoding an entire video sequence of the frames. Otherwise, when the reinforcement operations generate a single QP to encode one coding unit (such as an MB or CTU), then a single episode is performed when encoding a single one frame. On the other hand, an iteration, herein, happens each time a QP is generated.

In addition to the DQN target network used for the DDPG herein, other techniques may be used to improve the RL training accuracy and efficiency. For example, experience replay also may be employed in the DDPG structure to enable a fast and stable convergence. Experience replay is a memory technique used to make the network update in an uncorrelated manner and to reuse collected experiences many times to increase efficiency and accuracy. For experience replay, the agent's experiences are stored at each time-step, et=(st, at, rt, st+1) in a data-set D=e1, . . . , eN, pooled over many episodes into a replay memory. Then, the memory may be randomly sampled for a minibatch of experience, and this is used to learn off-policy, as with deep Q-networks. This tackles the problem of autocorrelation leading to unstable training, by making the problem more like a supervised learning problem.

Thus, instead of running DDPG-learning on state-action pairs as they occur during simulation or actual experience, the system stores the data discovered, such as for the state, action, reward, and next state, and stored in a large table. By one form, this does not store associated values, but instead stores the raw data to feed into action-value calculations later.

The learning phase is then logically separate from the gaining experience, and based on taking random samples from this table. The two processes, acting and learning, still need to be interleaved because improving the policy will lead to different behavior that should explore actions closer to optimal ones, and these should be learned from. However, the operations can be divided as desired where, for example, one operation can learn from three random prior operations, and so forth.

The advantages of experience play are more efficient use of the previous experience by learning with the experience play multiple times. This can be very helpful when it is costly to gain real-world experience. The Q-learning (or critic value network) updates are incremental and do not converge quickly so that multiple passes with the same data is beneficial, especially when low variance exists in immediate outcomes (reward, next state) given the same state-action pair. Also, better convergence behavior when training a function approximator can be achieved. This results partly because the data is more similar to independent and identically distributed (iid) data assumed in most supervised learning convergence proofs.

In addition, in one or more implementations, noise may be intentionally added to the parameter space, action space, or both to facilitate the exploration process for actions by assisting with the model generalization and robustness.

While implementation of the example processes 200, 300, and 600 discussed herein may include the undertaking of all operations shown in the order illustrated, the present disclosure is not limited in this regard and, in various examples, implementation of the example processes herein may include only a subset of the operations shown, operations performed in a different order than illustrated, or additional or less operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 9:
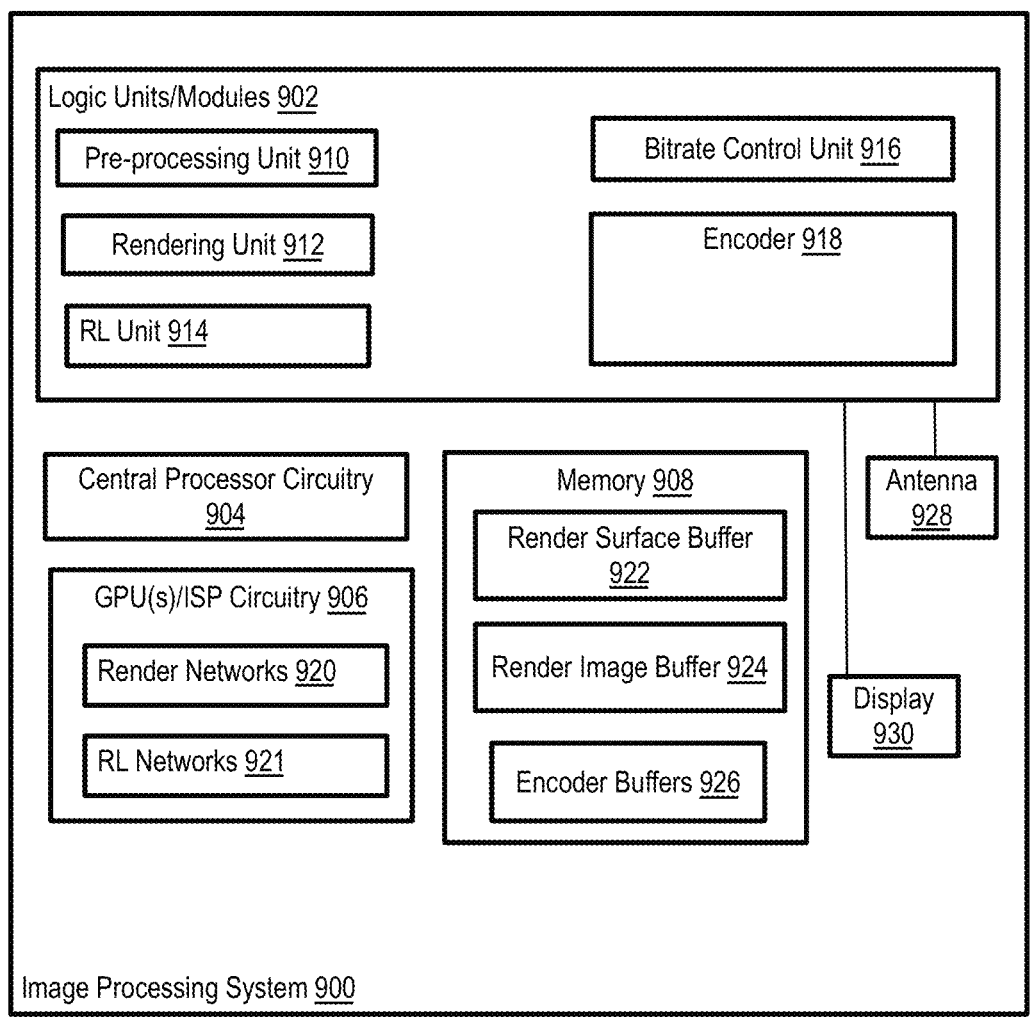
FIG. 9 is an illustrative diagram of an example system.

FIG. 9 is an illustrative diagram of an example image processing system or device 900 for video coding, arranged in accordance with at least some implementations of the present disclosure. As shown in FIG. 9, system 900 may include central processor circuitry 904, at least one GPU and/or ISP 906, logic units or modules 902, and a memory 908. The logic units 902 may have a pre-processing unit 910, a rendering unit 912, an RL unit 914, a bitrate control unit 916, and an encoder 918 to transmit compressed data, and which may or may not also include a decoder to decompress received compressed data. System 900 also may have an antenna 928 for transmission or reception of compressed image data and the like. A display 930, whether local or remote, may be provided to display rendered images as mentioned above. The details and operation of these components to perform the disclosed methods and operate the disclosed systems are described above.

In an implementation, the GPU and/or ISP circuitry 906 may form render networks 920 and RL networks 921 including the policy and value networks described above. The memory 908 may store one or more render surface buffers 922, render image buffers, 924, and/or encoder buffers 926. Memory 908 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 803 may be implemented by cache memory.

Processor circuitry 904 and 906 may include any number and type of central, video, image, or graphics processing units that may provide the processors to perform the operations as discussed herein. Processor circuitry 904 and 906 may provide firmware or hardware, and operate software, or any combination thereof, and may have programmable logic or circuitry such as a logic core or cores that may provide a wide array of programmable logic functions. In an implementation, processor(s) may include dedicated hardware such as fixed function circuitry. Fixed function circuitry may include dedicated logic or circuitry and may provide a set of fixed function entry points that may map to the dedicated logic for a fixed purpose or function.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

Figure 10:
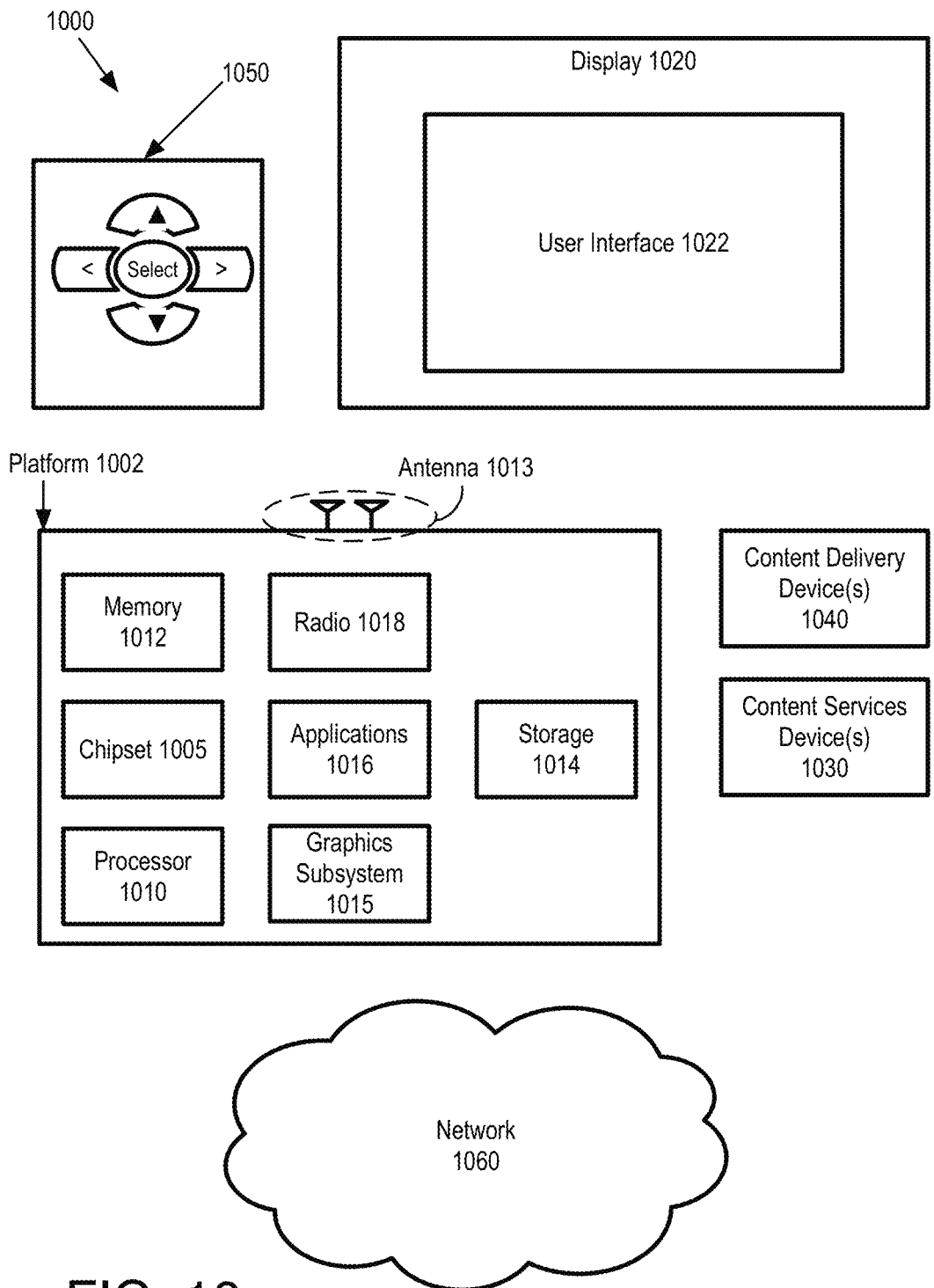
FIG. 10 is an illustrative diagram of another example system.

FIG. 10 is an illustrative diagram of an example system 1000, arranged in accordance with at least some implementations of the present disclosure, and may be any of systems 100, 400, 500, 700, 800, and/or 900, or may operate any of processes 200, 300, or 600, described above. In various implementations, system 1000 may be a server, cloud server, internet server, networked computer, or such networked computing device. By other implementations, system 1000 may be a mobile system. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various implementations, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various implementations, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 10.1 surround sound audio, for example. Drivers may include a graphics driver for integrated graphics platforms. In various implementations, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words that are provided for an automated system. For example, control information may be used to route media information through a system, or instruct a node to process the media information in a predetermined manner. The implementations, however, are not limited to the elements or in the context shown or described in FIG. 10.

Figure 11:
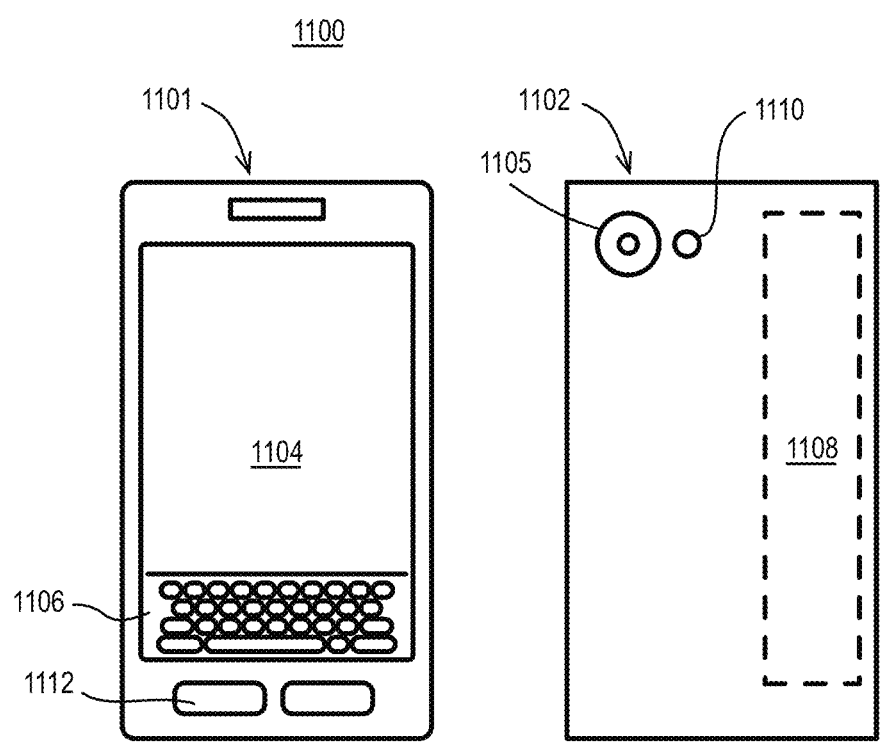
FIG. 11 illustrates an example device, all arranged in accordance with at least some of the implementations of the present disclosure.

As described above, system 900 or 1000 may be embodied in varying physical styles or form factors. FIG. 11 illustrates an example small form factor device 1100, arranged in accordance with at least some implementations of the present disclosure. In some examples, system 900 or 1000 may be implemented via device 1100. In other examples, system 100, 400, 500, 700, 800, or portions thereof may be implemented via device 1100. In various implementations, device 1100 may be implemented as a networked computer and/or mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include one or more cameras 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as IP cores, may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first implementations, a device for video coding comprises memory to store at least one video; and at least one processor communicatively coupled to the memory and being arranged to operate by:

The following examples pertain to additional implementations.

By an example one or more first implementations, a computer-implemented method of video coding comprises obtaining a sequence of video frames to be encoded; obtaining at least one rendering surface of at least one frame of the sequence and providing pixel information based on render domain data; and determining an encoder setting to encode the at least one frame and comprising using the at least one rendering surface.

By one or more second implementation, and further to the first implementation, wherein the render domain data includes at least color data of vertices of primitives of at least one frame.

By one or more third implementations, and further to the first or second implementation, wherein the rendering surface is a multi-sample control surface (MCS) that forms a pixel-level rendering edge map of the at least one frame at least partly based on sub-pixel samples.

By one or more fourth implementations, and further to any of the first to third implementation, wherein the rendering surface is stored at a buffer of a graphics processing unit to use the rendering surface for rendering of the at least one frame.

By one or more fifth implementations, and further to any of the first to third implementation, wherein the method comprising using a version of data of the rendering surface as input to one or more neural networks that output values to be used to set the encoder setting.

By one or more sixth implementations, and further to any of the first to fifth implementation, wherein the determining comprises generating at least one bitrate or at least one quantization value to encode at least part of the at least one frame.

By one or more seventh implementations, and further to any of the first to fifth implementation, wherein the determining comprises generating at least one bitrate or at least one quantization value to encode at least part of the at least one frame, and wherein the bitrate is per-frame or per coding tree unit (CTU) block.

By one or more eighth implementations, and further to any of the first to seventh implementation, wherein the method comprising using the rendering surface as at least part of a state provided from an environment of a reinforcement learning algorithm, and being used to generate an action of the reinforcement learning to be used to set the encoder setting.

By an example one or more ninth implementation, a computer-implemented system comprises memory to store data of at least part of at least one video sequence of frames and data of at least one rendering surface of at least one of the frames; and processor circuitry forming at least one processor communicatively coupled to the memory and being arranged to operate by: obtaining a sequence of video frames to be encoded; obtaining at least one rendering surface of at least one frame of the sequence and providing pixel information based on render domain data; and determining an encoder setting to encode the at least one frame of the sequence and comprising using the at least one rendering surface.

By an example one or more tenth implementations, and further to the ninth implementation, wherein the rendering surface is a multi-sample control surface (MCS) that forms a pixel-level rendering edge map of the at least one frame at least partly based on sub-pixel samples.

By one or more eleventh implementations, and further to the ninth or tenth implementation, wherein the data of the rendering surface is used to determine a bitrate related value to perform quantization and alternatively per frame or per coding block.

By one or more twelfth implementations, and further to any of the ninth to eleventh implementation, wherein the at least one processor is arranged to operate by using a version of data of the rendering surface as input to one or more neural networks that output values to be used to set the encoder setting.

By one or more thirteenth implementations, and further to any one of the ninth to twelfth implementation, wherein the at least one processor is arranged to operate by using the rendering surface as at least part of a current state provided from an environment of a reinforcement learning algorithm, and being used to generate an action of the reinforcement learning to be used to set the encoder setting.

By an example one or more fourteenth implementation, at least one non-transitory article has at least one machine readable medium comprising a plurality of instructions that, in response to being executed on a computing device, cause the computing device to operate by: obtaining a sequence of video frames to be encoded; generating a reinforcement learning action value at least partly based on a current state associated with a frame being encoded and feedback rewards that represent evaluation of previous action values; and setting an encoder setting comprising using the action value to encode at least part of the frame.

By one or more fifteenth implementations, and further to the fourteenth implementation, wherein the generating comprises generating the current state to indicate complexity of content of at least one of the frames.

By one or more sixteenth implementations, and further to the fourteenth or fifteenth implementation, wherein the current state comprises bit consumption status data.

By one or more seventeenth implementations, and further to further to the fourteenth implementation, wherein the current state comprises encoder residuals or a quantization-related value of a previous state and a resulting previous action associated with the previous state or encoder residuals or both.

By one or more eighteenth implementations, and further to the fourteenth implementation, wherein the feedback rewards comprise one or more values that indicate quality of the encoded images and actual bitstream status relative to a target bitrate.

By one or more nineteenth implementations, and further to the fourteenth implementation, wherein the generating comprises generating the current state comprising obtaining at least one rendering surface of at least one frame of the sequence and providing pixel information based on render domain data.

By one or more twentieth implementations, and further to the fourteenth implementation, wherein the generating comprises using an agent with an actor policy network that receives the current states as input to output the actions.

By one or more twenty-first implementations, and further to the fourteenth implementation, wherein the generating comprises using an agent with an actor policy network that receives the current states as input to output the actions, and wherein the agent comprises a critic value network that receives the current state and action as input and outputs a gradient to update parameters of the actor policy network.

By one or more twenty-second implementations, and further to the fourteenth implementation, wherein the generating comprises using an agent with an actor policy network that receives the current states as input to output the actions, and wherein the agent comprises a critic value network that receives the current state and action as input and outputs a gradient to update parameters of the actor policy network, and wherein the feedback rewards are arranged to update parameters of the critic value network.

By an example one or more twenty-third implementation, an apparatus comprises memory to store data of at least part of at least one frame of a video sequence of frames to be encoded; and processor circuitry forming at least one processor communicatively coupled to the memory and being arranged to operate by: generating a reinforcement learning action value at least partly based on a current state associated with a frame being encoded and feedback rewards that represent evaluation of previous action values; and setting an encoder setting to encode at least one frame of the sequence comprising using the action value.

By one or more twenty-fourth implementations, and further to the twenty-third implementation, wherein the instructions cause the computing device to operate by wherein the action is a quantization parameter (QP) value as the encoder setting or the encoder setting is a bitrate.

By one or more twenty-fifth implementations, and further to the twenty-third implementation, wherein the current state is arranged to be input to a first neural network that outputs the actions, wherein parameters of the first neural network are updated by an output from a second neural network that receives a current state and resulting action as input, and wherein the feedback rewards are arranged to be used to update parameters of the second neural network.

In one or more twenty-sixth implementations, a device, apparatus, or system includes means to perform a method according to any one of the above implementations.

In one or more twenty-seventh implementations, at least one machine readable medium includes a plurality of instructions that in response to being executed on a computing device, cause the computing device to perform a method according to any one of the above implementations.

It will be recognized that the implementations are not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the implementations should, therefore, be determined with reference to the appended claims, along with the full scope of equivalents to which such claims are entitled.

What is claimed is:

1. At least one non-transitory article having at least one machine readable medium comprising a plurality of instructions that, in response to being executed on a computing device, cause the computing device to operate by:
    obtaining a sequence of video frames to be encoded;
    generating a current state associated with a frame based on the frame of the sequence and a rendering surface of the frame of the sequence stored in a buffer of a graphics processing unit, the graphics processing unit to render the frame based on the rendering surface;
    generating a reinforcement learning action value at least partly based on the current state, wherein the current state is arranged to be input to a first neural network that outputs the reinforcement learning action value, and parameters of the first neural network are updated by an output from a second neural network that receives the current state and the reinforcement learning action value as input;
    generating a feedback reward by evaluating the reinforcement learning action value, the feedback reward having a value that indicates quality of an encoded frame and a bitstream status relative to a target bitrate, wherein the feedback reward is arranged to be used to update parameters of the second neural network; and
    setting an encoder setting using the reinforcement learning action value, the encoder setting being used to encode at least part of the frame.

2. The at least one non-transitory article of claim 1, wherein generating the current state comprises generating the current state to indicate complexity of content of the frame.

3. The at least one non-transitory article of claim 1, wherein the current state comprises bit consumption status data.

4. The at least one non-transitory article of claim 1, wherein the current state comprises encoder residuals or a quantization-related value of a previous state and a resulting previous reinforcement learning action value associated with the previous state, the encoder residuals, or both.

5. The at least one non-transitory article of claim 1, wherein generating the current state comprises providing pixel information based on render domain data, the render domain data including at least color data of vertices of primitives of at least one frame.

6. The at least one non-transitory article of claim 1, wherein the generating the reinforcement learning action value comprises using an agent with an actor policy network that receives the current state as input to output the reinforcement learning action value.

7. The at least one non-transitory article of claim 6, wherein the agent comprises a critic value network that receives the current state and the reinforcement learning action value as input and outputs a gradient to update parameters of the actor policy network.

8. The at least one non-transitory article of claim 7, wherein the feedback reward is arranged to update parameters of the critic value network.

9. The at least one non-transitory article of claim 1, wherein the rendering surface is a multi-sample control surface (MCS) that forms a pixel-level rendering edge map of the frame at least partly based on sub-pixel samples.

10. The at least one non-transitory article of claim 1, wherein the encoder setting is a bitrate per-frame or per coding tree unit (CTU) block.

11. An apparatus comprising:
    memory to store data of at least part of at least one frame of a video sequence of frames to be encoded; and
    processor circuitry forming at least one processor communicatively coupled to the memory and being arranged to operate by:
        generating a current state associated with a frame based on the frame of the sequence and a rendering surface of the frame of the sequence stored in a buffer of a graphics processing unit, the graphics processing unit to render the frame based on the rendering surface;
        generating a reinforcement learning action value at least partly based on the current state, wherein the current state is arranged to be input to a first neural network that outputs the reinforcement learning action value, and parameters of the first neural network are updated by an output from a second neural network that receives the current state and the reinforcement learning action value as input;

generating a feedback reward by evaluating the reinforcement learning action value, the feedback reward having a value that indicates quality of an encoded frame and a bitstream status relative to a target bitrate, wherein the feedback reward is arranged to be used to update parameters of the second neural network; and setting an encoder setting using the reinforcement learning action value, the encoder setting being used to encode at least a part of the frame.

12. The apparatus of claim 11 wherein the reinforcement learning action value is a quantization parameter (QP) value, and the encoder setting is a bitrate.

13. The apparatus of claim 12, wherein the bitrate is per-frame or per coding tree unit (CTU) block.

14. The apparatus of claim 11, wherein generating the current state comprises generating the current state to indicate complexity of content of the frame.

15. The apparatus of claim 11, wherein the current state comprises bit consumption status data.

16. The apparatus of claim 11, wherein the current state comprises encoder residuals or a quantization-related value of a previous state and a resulting previous reinforcement learning action value associated with the previous state, the encoder residuals, or both.

17. The apparatus of claim 11, wherein generating the current state comprises providing pixel information based on render domain data, the render domain data including at least color data of vertices of primitives of the frame.

18. The apparatus of claim 11, wherein the rendering surface is a multi-sample control surface (MCS) that forms a pixel-level rendering edge map of the at least one frame at least partly based on sub-pixel samples.

19. A method, comprising:

obtaining a sequence of video frames to be encoded;

generating a current state associated with a frame based on the frame of the sequence and a rendering surface of the frame of the sequence stored in a buffer of a graphics processing unit, the graphics processing unit to render the frame based on the rendering surface;

generating a reinforcement learning action value at least partly based on the current state, wherein the current state is arranged to be input to a first neural network that outputs the reinforcement learning action value, and parameters of the first neural network are updated by an output from a second neural network that receives the current state and the reinforcement learning action value as input;

generating a feedback reward by evaluating the reinforcement learning action value, the feedback reward having a value that indicates quality of an encoded frame and a bitstream status relative to a target bitrate, wherein the feedback reward is arranged to be used to update parameters of the second neural network; and setting an encoder setting using the reinforcement learning action value, the encoder setting being used to encode at least part of the frame.

20. The method of claim 19, wherein generating the current state comprises generating the current state to indicate complexity of content of the frame.

21. The method of claim 19, wherein the current state comprises bit consumption status data.

22. The method of claim 19, wherein the current state comprises encoder residuals or a quantization-related value of a previous state and a resulting previous reinforcement learning action value associated with the previous state, the encoder residuals, or both.

23. The method of claim 19, wherein generating the current state comprises providing pixel information based on render domain data, the render domain data including at least color data of vertices of primitives of at least one frame.

24. The method of claim 19, wherein the rendering surface is a multi-sample control surface (MCS) that forms a pixel-level rendering edge map of the frame at least partly based on sub-pixel samples.

25. The method of claim 19, wherein the encoder setting is a bitrate per-frame or per coding tree unit (CTU) block.

* * * * *